Feb. 3. 1925.
W. R. ANDERSON
1,525,162
SINGLE APERTURE DOUBLE MIRROR VIEW FINDER
Filed Nov. 2, 1920
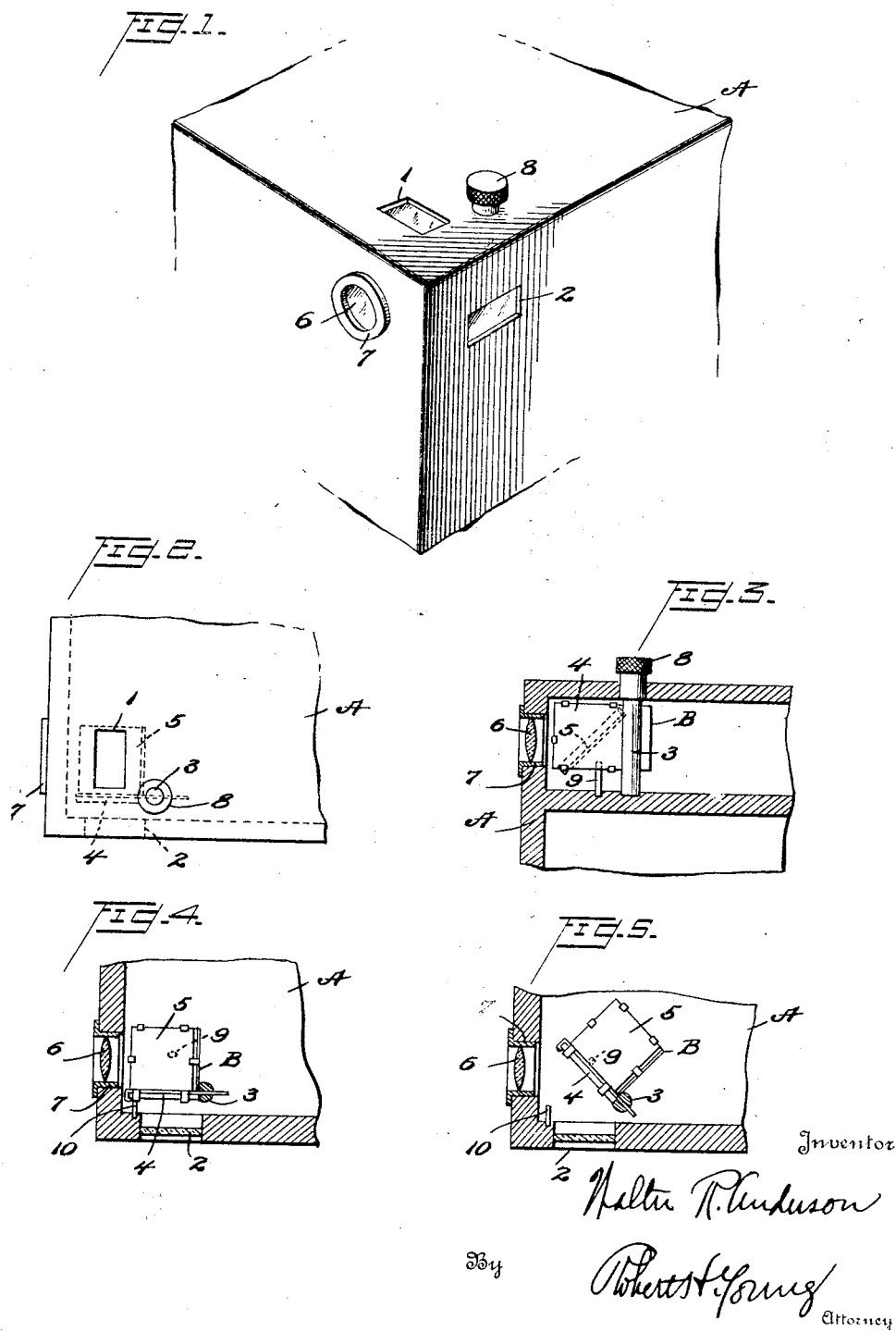

Patented Feb. 3, 1925.

1,525,162

UNITED STATES PATENT OFFICE.

WALTER R. ANDERSON, OF CHICAGO, ILLINOIS.

SINGLE-APERTURE DOUBLE-MIRROR VIEW FINDER.

Application filed November 2, 1920. Serial No. 421,416.

*To all whom it may concern:*

Be it known that I, WALTER R. ANDERSON, a citizen of the United States, residing at Chicago, in the county of Cook and State of Illinois, have invented certain new and useful Improvements in Single-Aperture Double-Mirror View Finders, of which the following is a specification.

My invention relates to view finders especially adapted for use in conjunction with photographic cameras and the like. The main object of the invention is to provide a simple, inexpensive and easily manufactured view finder which may be applied to any photographic camera, especially of the box camera type, the improved view finder being adapted to be housed within one corner of the box, said finder comprising a movable or pivotally mounted finder member which is capable of reflecting the image from a single lens through observation apertures in two sides of the camera box which sides are usually at a right angle to each other.

The improvement herein contemplated and hereinafter particularly described and illustrated eliminates the use of one of the two lenses now ordinarily employed, while retaining the view or image in one corner of the camera box. The improvement also reduces the expense of manufacture, installation and maintenance of the view finder as compared with the types at present in use.

To the bove end the invention consists in the novel construction, combination and arrangement herein described, illustrated and claimed.

In the accompanying drawings:

Figure 1 is a perspective view of a sufficient portion of a camera to illustrate the present invention in its applied relation thereto;

Figure 2 is a fragmentary plan view thereof;

Figure 3 is a fragmentary vertical section through the camera box showing the construction of the improved finder;

Figure 4 is a fragmentary horizontal section through the same; and

Figure 5 is a section similar to Figure 4 showing the finder in position for a horizontally elongated picture.

Referring to the drawings A designates a camera box. Arranged in one corner of the box is the view finder of this invention, the same comprising a pivotally mounted image reflecting member designated as a whole at B, the camera box being provided in the top wall thereof with an observation aperture 1, and being further provided in the adjacent side wall thereof with another observation aperture 2, one of said apertures being used in taking horizontally elongated pictures and the other aperture being used in taking vertically elongated pictures.

The image reflecting member B comprises a short shaft or spindle 3 having fixedly attached thereto a mirror or reflecting surface 4, the plane of which is in line with the spindle 3 as clearly shown in the different views of the drawings. In addition to the mirror or reflecting surface 4, the image reflecting member B comprises a second mirror or reflecting surface 5 which is arranged behind the first mentioned reflecting surface 4 being perpendicular thereto and extending diagonally or obliquely across the rear side of the reflecting surface 4 so that when in use, the reflecting surface 5 is at substantially a 45° angle to the focal axis of the view finding lens shown at 6 and mounted in the usual opening 7 provided therefor in the front side of the camera box.

The spindle 3 is mounted in suitable bearings in the camera box and extends at one end through the top wall of said box where it is provided with a milled head or finger piece 8 by means of which the image reflecting member may be swung in one direction or the other. When moved in one direction, it comes in contact with a limiting stop 9, the latter holding the reflecting surface 4 at substantially a 45° angle to the focal axis of the lens 6. When moved in the other diection by means of the spindle 3, such movement is checked by another stop 10 which holds the reflecting surface 5 in position to receive the image from the lens 6.

From the foregoing description taken in conjunction with the accompanying drawings, the operation of the improved view finder will now be understood. A single view finding lens 6 is all that is required and when used in conjunction with the two reflecting surfaces of the image reflecting member B, the image may be observed through either the aperture 1 or the aperture 2 according to whether a vertically elongated or horizontally elongated picture is to be taken. The movement of the image reflecting member from one position to the other is effected in a simple manner by merely grasping and turning the knob 8 to the limit of its movement in the desired direction. The device is simple and cheap in construction, is mounted in one corner of the camera box and is easily manipulated.

I claim:

In combination with a camera box, a view finding lens fixed in the wall of the box, a manually operable spindle journaled in said box and protruding therefrom, and an image reflecting member fast on said spindle and adapted to be swung thereby through an arc of ninety degrees, said image reflecting member comprising a reflecting surface lying in a plane parallel to the axis of the spindle, and another reflecting surface lying at an angle of forty-five degrees to the axis of the spindle and located behind the first named reflecting surface.

In testimony whereof I have affixed my signature.

WALTER R. ANDERSON.